Oct. 31, 1933.    J. E. FISHBURN    1,933,104
MOTOR VEHICLE MILEAGE METER

Filed Sept. 20, 1932

INVENTOR
John Eskdale Fishburn
BY
Marshall & Hawley.
ATTORNEYS

Patented Oct. 31, 1933

1,933,104

UNITED STATES PATENT OFFICE 1,933,104

MOTOR VEHICLE MILEAGE METER

John Eskdale Fishburn, London, England

Application September 20, 1932
Serial No. 634,003

5 Claims. (Cl. 235—30)

This invention relates to motor vehicle mileage meters and particularly to taxicab meters.

It is common practice to provide a taximeter with a trip mileage indicator as well as a fare indicator. The meter is ordinarily set in operation by moving the control arm or "flag" to operating or "occupied" position. However, if the vehicle operator is dishonest he may fail to move the flag to operating position and in that case the meter will not register the correct "pay" mileage.

This invention has for its salient object to provide a check on the meter mileage indicator by providing means automatically set in operation when the cab is occupied for registering the total "pay" mileage traveled by the vehicle or cab.

Another object of the invention is to provide a mileage meter with driving connections so constructed and arranged that the presence of a passenger in the cab will automatically set the mileage indicator in operation.

Figure 1:
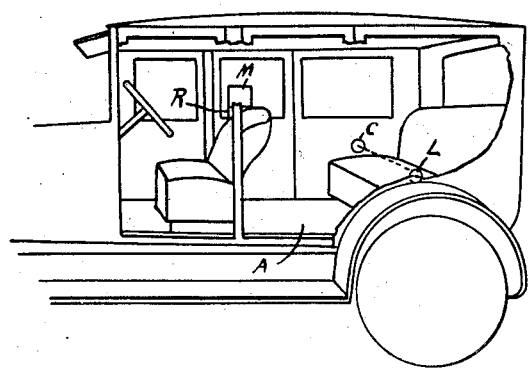
Figure 2:
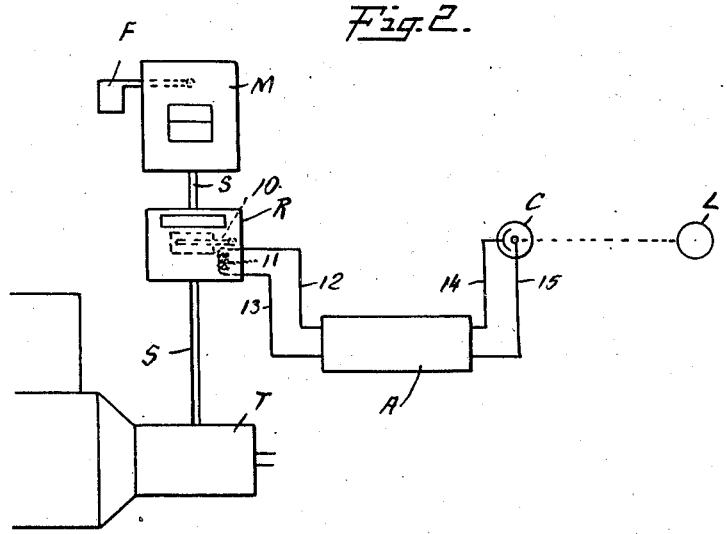

Further objects of the invention will appear from the following specification taken in connection with the drawing which form a part of this application, and in which Fig. 1 is a perspective view partly broken away of a portion of the taxicab showing the meter and control means; and Fig. 2 is a diagrammatic view showing the connections whereby the meter is controlled.

The invention briefly described consists of a mileage indicator for a motor vehicle, operative driving connections for the meter including a magnetically controlled clutch, and means operative automatically by the passenger for closing the clutch and automatically operating the meter. The control means consists of a photoelectric cell located at one side of the cab and preferably slightly above the seat, a source of light similarly located on the opposite side of the cab and in such a position that the beam of light will be focused on the cell unless a passenger is seated in the cab, in which case the beam will be interrupted. The photoelectric cell is connected through a suitable relay and amplifier to operate the magnetic clutch and set the mileage indicator in operation when the beam of light is interrupted by the presence of a passenger on the seat.

Further details of the invention will appear from the following description.

In Fig. 1 there is shown a portion of a motor vehicle or taxicab A having the usual taximeter M and control arm or flag F. In the ordinary taximeter the flag is raised when the cab is "for hire" and is lowered to the position shown in Fig. 2 when occupied. When the flag is lowered the meter M will operate and indicate the mileage and fare. The meter M is usually driven from the transmission T by a shaft S.

In Fig. 2 there is shown a mileage recorder or meter R which is provided for the purpose of recording the total "pay" mileage traveled by the cab. The mileage recorder is also driven by the shaft S, but the driving connections are controlled by a magnetic clutch member 10 which in turn is controlled by a magnet coil 11.

Means is provided for automatically energizing the coil 11 when a passenger is seated in the cab. This means comprises a photoelectric or selenium cell C which, as shown in Fig. 1, is located at one side of the cab and slightly above the rear seat and a source of light L which is located on the opposite side of the cab and in a position to focus the beam on the cell C. The photoelectric cell is connected through a relay and amplifier A of any suitable construction to the circuit of the magnet coil 11, the coil, as shown, being connected to wires 12 and 13. The connections from the cell to the amplifying unit are shown at 14 and 15.

As is well known, when a beam of light is focused on a photoelectric cell of the selenium type the resistance of the cell decreases. In another type the effect of light is to release electrons from the surface and so cause a current to flow in the space between the light sensitive surface and another electrode. Use is made of this property in various applications of photoelectric cells and in this particular case the output of the cell will be varied when the beam is interrupted by a passenger on the seat of the vehicle. The change in the output of the cell will in turn operate the relay and through the amplifier operate the magnetic clutch member 10 and close the driving connections to the mileage meter R. As long as the passenger is seated in the cab the driving connections for the mileage meter R will remain closed and the meter will operate. When the passenger leaves the cab the beam from the source of supply L will then be focused on the cell C and the magnet coil 11 will be deenergized, thus disconnecting the mileage meter R from the driving shaft S. It will be understood that any desired type of photoelectric cell may be used.

From the foregoing description it will be seen that a simple and practical automatic control means has been provided for insuring the recording of the total pay mileage in a taxicab or motor vehicle.

Athough one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. In a motor vehicle, a mileage recording meter, driving means for said meter, and means automatically set in operation by the presence of a passenger in the vehicle for connecting said driving means to said meter, said means including means in the passenger compartment of the vehicle for throwing a beam of light and a photoelectric cell in the path of the beam.

2. In a motor vehicle, a mileage recording meter, driving connections for said meter including a clutch, means in the passenger compartment of the vehicle for throwing a beam of light, within the vehicle in a position to be interrupted by the presence of a passenger, a photoelectric cell in the path of said beam, and means controlled by said cell for operating said clutch.

3. In a motor vehicle, a mileage recording meter, driving connections for said meter including a clutch, means in the passenger compartment of the vehicle for throwing a beam of light across the vehicle in a position to be interrupted by a passenger seated in the vehicle, a photoelectric cell in the path of said beam, and means controlled by said cell for operating said clutch.

4. In a motor vehicle, a mileage indicator, driving connections therefor including a clutch, means for throwing a beam of light across the passenger seat in the vehicle, and in a position to be interrupted by the presence of a passenger, a photoelectric cell in the path of the beam, and means controlled by the cell for operating the clutch.

5. In a motor vehicle, a mileage indicator, driving connections therefor including a clutch, means disposed at one side of the vehicle and slightly above a passenger seat for throwing a beam of light across the passenger seat in the vehicle, and in a position to be interrupted by a passenger seated on said seat, a photoelectric cell at the other side of the vehicle and in the path of the beam, and means controlled by the cell for operating the clutch.

JOHN ESKDALE FISHBURN.